E. B. KILLEN.

WHEEL.

APPLICATION FILED MAY 25, 1917.

1,281,170.

Patented Oct. 8, 1918.

Inventor:
Edward Brice Killen
By Calvin Calvert
Attys.

E. B. KILLEN.
WHEEL.
APPLICATION FILED MAY 25, 1917.

1,281,170. Patented Oct. 8, 1918.

Inventor:
Edward Brier Killen,
By Edward Calvert. Attys.

E. B. KILLEN.

WHEEL.

APPLICATION FILED MAY 25, 1917.

1,281,170.

Patented Oct. 8, 1918.

Inventor:
Edward Brier Killen.
By Calver & Calver Attys

E. B. KILLEN.
WHEEL.
APPLICATION FILED MAY 25, 1917.

1,281,170.

Patented Oct. 8, 1918.
6 SHEETS—SHEET 4.

Inventor:
Edward Brice Killen.
By Alborn & Calver Attys.

E. B. KILLEN.
WHEEL.
APPLICATION FILED MAY 25, 1917.

1,281,170. Patented Oct. 8, 1918.
6 SHEETS—SHEET 5.

Inventor: Edward Brice Killen,
By Alvord Calvert Attys.

E. B. KILLEN.
WHEEL.
APPLICATION FILED MAY 25, 1917

1,281,170. Patented Oct. 8, 1918.
6 SHEETS—SHEET 6.

Inventor:
Edward Brice Killen,
By Calver Calvert Attys.

UNITED STATES PATENT OFFICE.

EDWARD BRICE KILLEN, OF LONDON, ENGLAND.

WHEEL.

1,281,170. Specification of Letters Patent. Patented Oct. 8, 1918.

Application filed May 25, 1917. Serial No. 170,931.

*To all whom it may concern:*

Be it known that I, Edward Brice Killen, of 27 Queen Victoria street, London, E. C., England, engineer, have invented certain new and useful Improvements in or Relating to Wheels, of which the following is a specification.

This invention relates to the construction and standardization of wheels which are capable of being easily attached to practically all types of chassis, and which also enable the many different types, diameters and widths of pneumatic, solid rubber, and other tires on the market to be easily and quickly interchanged with each other. The complete wheel is preferably constructed in two important parts. One part I call the outer circumference part which has an outer bed circumference and also a suitable internal interchanging attachment flange. This flange enables the outer circumference part with tire attached to be easily interchanged with another circumference part, or reversed in a few minutes anywhere. The other part I will call the standardized boss central part, which is constructed capable of being rigidly fitted to practically all types of hubs, hub shells, drums or gears regardless of their shape or dimensions, and when used it may form a universal design on the chassis to which it is attached, thereby enabling all types and dimensions of tires to be easily and quickly interchanged over it by using a suitable outer interchangeable circumference part. The outer circumference part may be constructed in different dimensions and shapes to enable the many different existing types and dimensions of tires and their tire retaining rims to be rigidly fitted over its outer bed circumference, provided it has the necessary interchanging and reversing attachment flange, which enables a quick interchange to take place between an outer circumference part with tire attached, and the standardized boss central part. At present it is impossible to interchange the many different types and dimensions of tires on the market on any chassis or from one type of chassis to another, but this invention overcomes this difficulty and enables an easy interchange of one type or dimension of tire with another to take place on practically all types of chassis.

In order that my invention may be properly understood and readily carried into effect, I have hereunto appended six sheets of drawings, which illustrate the same.

Figures 1, 2:
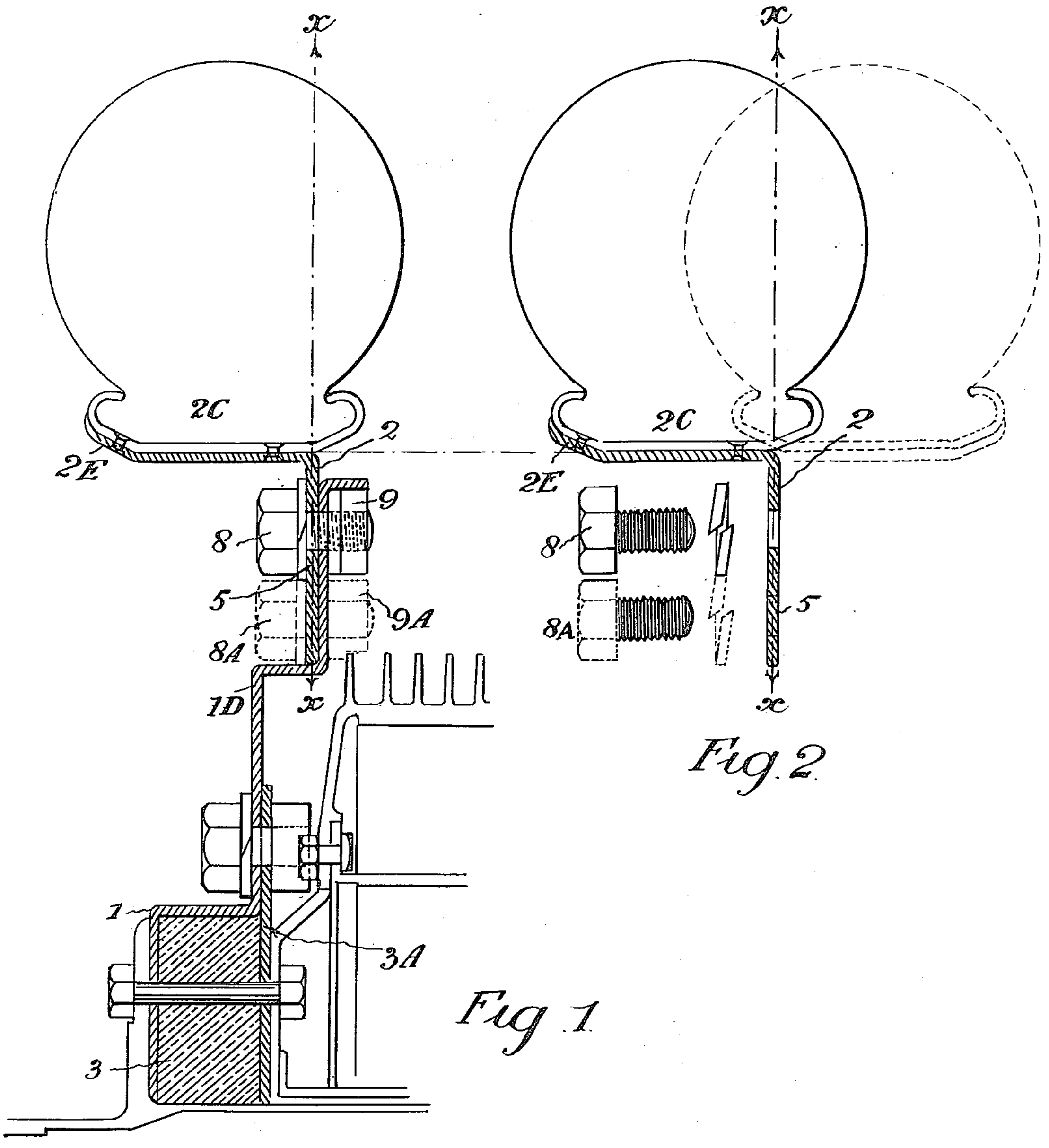
Figure 1 is a section elevation of one type of single disk wheel manufactured in two principal parts, mounted upon its hub and with the outer interchangeable and reversible circumference part and pneumatic tire rigidly attached to the central boss part, showing the vertical line X.
Fig. 2 is a sectional elevation of the interchangeable and reversible circumference part detached from the central boss part, showing how the reversing flange may be reversed on the vertical line X.

The standardized boss central part 1, $1^A$, $1^B$, for single wheels may be constructed from a metal stamping $1^D$, $1^E$, $1^F$, which is formed with a suitable boss part over which the outer circumference part 2, $2^A$, $2^B$, may be interchanged. A renewable center wood filling 3 is preferably keyed and locked within the center cavity 4 of the metal boss stamping $1^A$, see Fig. 1, and this wood filling 3 may be turned out and shaped to take any shape or dimension of hub or hub shell, and enables the standardized boss central part to be snugly and rigidly fitted to practically any hub or hub shell.

The standardized metal boss part 1, $1^A$, etc., is preferably constructed so that the widest pitch of the nuts and bolts of existing hubs or drums or other hub parts are not interfered with when interchanging the outer circumference part over the standardized boss central part by means of the interchanging flange 5, $5^A$, $5^B$, see Figs. 1, 2, 4, 5, 6, 8 and 11. When the outer circumference part 2, $2^A$, $2^B$, of the wheel is fitted snugly over the standardized boss central part 1, $1^A$, $1^B$, it may be rigidly held in position by attachment bolts, nuts and flanges or in any other well known manner, and the drive between the interchangeable internal flange and the standardized boss central part may be arranged by suitably slotting the inner circumference of the interchangeable attachment flange or flanges, the slotted portions 6 being made under such conditions to say fit snugly over metal key bars 7 riveted to the metal circumference of the standardized boss, see Figs. 6 and 7, the attachment bolts 8 being, under such conditions, used principally for holding each interchanging outer circumference part rigidly and correctly in its keyed position to and over the boss central part. The stems of the attachment bolts 8, $8^A$, may pass through each interchangeable attachment flange of the outer circumference part into suitable screw tapped brackets 9, $9^A$, riveted on the back face of the universal metal boss stampings $1^D$, $1^E$, $1^F$, $1^G$. These screw tapped brackets 9, $9^A$, may be riveted at equal distances apart from each other to take the screw ends of the suitable attachment bolts 8, $8^A$, and if two rows of bolts are used, they are preferably staggered or the rigid attachment between the interchanging attachment flange 5, $5^A$, $5^B$, of the outer circumference part and the boss central part 1, $1^A$, $1^B$, $1^C$, may be arranged by means of suitable knobs riveted to the central boss part, which are made to fit into corresponding holes formed in the interchanging attachment flange for their reception, which knobs engage in slots by turning slightly around the outer circumference part, thereby keying the outer circumference part rigidly to the central boss part, but not locking it in position, the two wheel parts being securely locked together by attachment bolts 8, $8^A$, which pass through the interchanging flange 5, $5^A$, $5^B$, into screw tapped brackets 9, $9^A$, riveted on the back face of the boss central part; or the attachment of the circumference part to the boss central part may be arranged in any other well-known manner.

The standardized central boss part with its renewable wood center enables the center line of the tire and central boss part to be fitted very close up to the chassis frame, and also enables a good rigid joint connection to be always arranged between the standardized boss central part and the chassis hub or hub shell, which may be snugly fitted and locked in position within the keyed renewable wood center, see Figs. 1, 4, 5, 8 and 11. When a hub shell has to be fitted inside the wood center, I preferably rivet to its back face flange an endless metal rim which may have say six suitable screw tapped brackets riveted thereto to take the ends of corresponding screw bolts. This attachment takes the drive between an existing hub shell and the standardized boss part of the wheel.

Figures 3, 4:
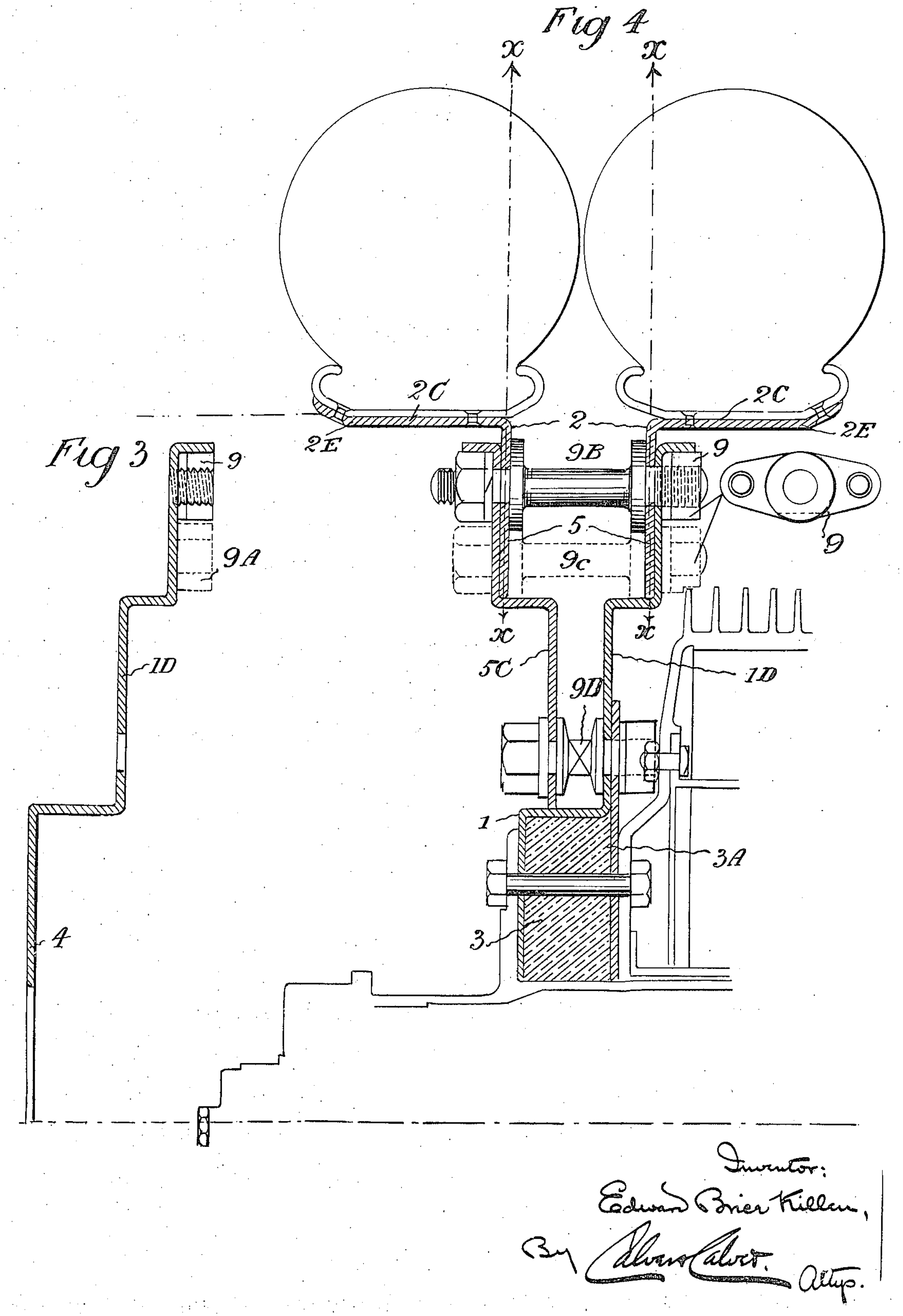
Fig. 3 is a sectional elevation of the central boss metal stamping showing the cavities formed on its back face.
Fig. 4 is a sectional elevation of a form of disk wheel similar to Fig. 1, but with two interchangeable and reversible circumference parts and two pneumatic tires attached.
Figures 5, 6:
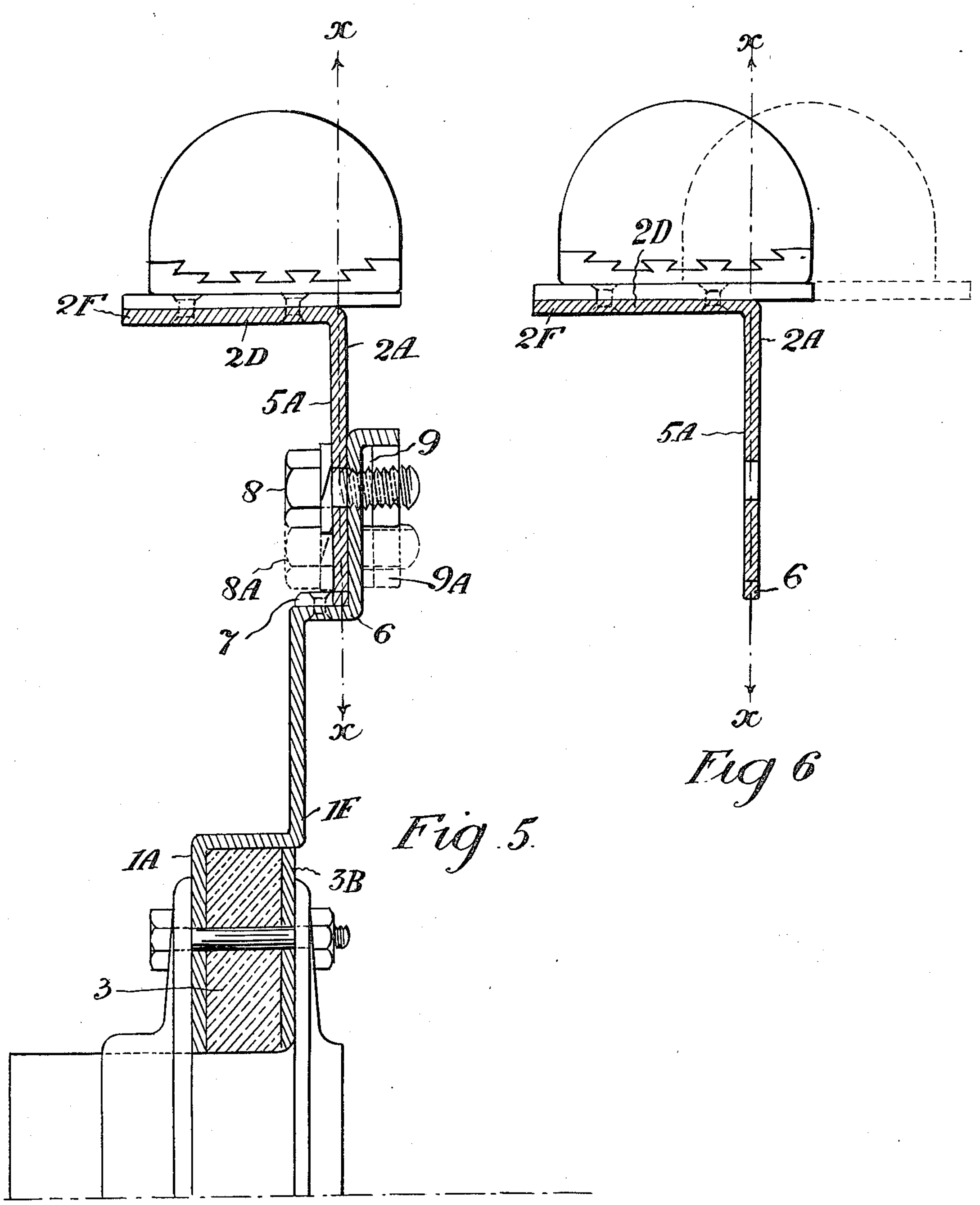
Fig. 5 is a modified form of Fig. 1 with a solid rubber band tire attached.
Fig. 6 is a modified form of Fig. 2 with a solid rubber band tire attached.
Figures 7, 8:
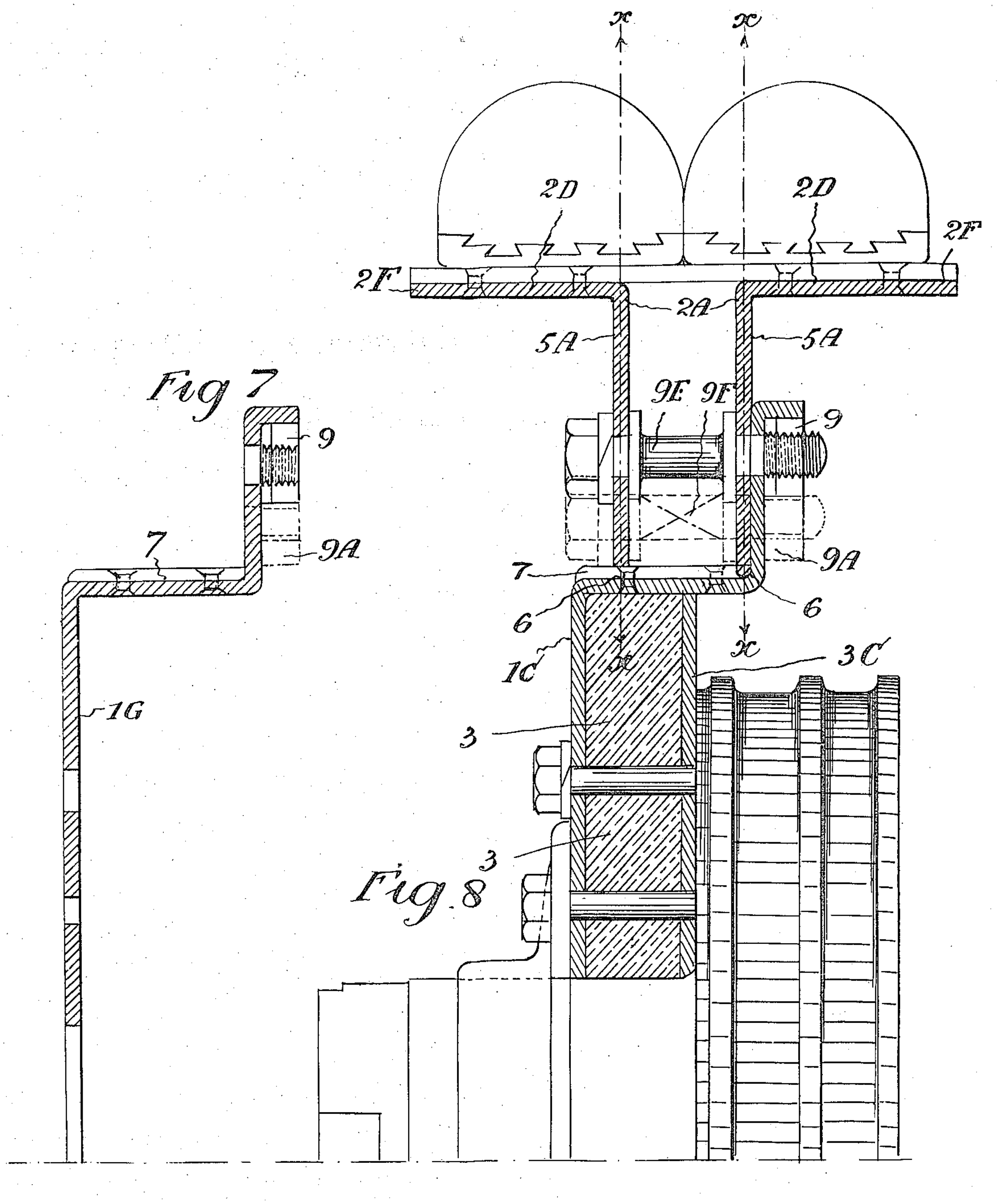
Fig. 7 is a modified form of Fig. 3.
Fig. 8 is a modified form of Fig. 4 with two solid rubber band tires attached.

The suitable light and strong interchanging circumference part 2, $2^A$, may be stamped from one piece of steel plate, and over its bed circumference $2^C$, $2^D$, an existing tire retaining rim may be securely riveted or fitted, see Figs. 1, 2, 4, 5, 6 and 8. On one side of the truly circular bed circumference a suitable extension $2^E$ may be formed, which tends to prevent an existing tire retaining metal rim, after it has been say riveted over the outer bed circumference, from being distorted under severe road wear and tear. When solid rubber band tires are attached, this extension $2^E$, see Figs. 5, 6 and 8, is preferably constructed to strengthen the edge of the tire retaining rim to which it is preferably riveted. This edge saves the rubber band tires from curbstone injuries. On the other side of the truly circular metal bed circumference the interchanging and reversing flange 5, $5^A$, is formed, which flange runs inward toward the wheel's center, and enables the interchangeable circumference part (with tire attached) to be easily interchanged or reversed over the standardized boss central part. Under certain conditions the interchanging reversible attachment flange $5^A$ may be reinforced and lengthened on its inner circumference for taking the drive between the interchangeable circumference part 2 and the standardized boss central part 1 of the wheel, by means of an additional metal rim or flange $5^C$, see Fig. 4.

When twin tires are used on the back of a chassis, the center line of each tire when fitted to the outer interchanging circumference part of the wheel is preferably not on the same vertical line as the interchanging attachment flange, the center line X of the interchanging attachment flange 5, $5^A$, may be arranged to be on a vertical line midway between the center line of the tire and the edge of the tire. By having the vertical center line X of the internal interchanging flange 5, $5^A$, see Figs. 1, 2, 4, 5, 6 and 8, arranged as described above, the wheel has many advantages, and it enables two outer circumference parts (when one is inverted or reversed) to form a twin wheel when the two outer circumference parts are securely fitted over a standardized boss central part, see Figs. 4 and 8, and it is to be specially noted that the reversing of an interchanging circumference part with tire attached, under such conditions, over the standardized boss part, changes the center line of the tire without altering the original position of the attaching flange to the chassis frame, and enables the correct center line of tire wanted to be obtained on the front and back axles of either commercial or pleasure chassis using six tires, see Figs. 2, 4, 6 and 8.

By means of this invention, the center line of each single tire on the front axle may be on the same center line as the center line of each inside back twin tire, and by reversing each outer circumference part on front wheels, the center line of each front tire may be changed to be on the same vertical line as the center line lying between the twin tires of each corresponding back wheel, see Figs. 2 and 6. As an illustration, if say a 4 inch wide tire is used, by reversing the outer circumference part with tire attached, the center line of the tire may be fitted either 2 inches nearer or 2 inches farther away from the chassis as desired, or if the width of the tires attached exceeds 4 inches, the extra width of said tires may be arranged to be all on one side of the interchanging flange when rigidly attached to the wheel's bed circumference, and the two interchanging flanges of the front wheels be then set farther back and closer up to the chassis frame by adjusting the boss central parts farther back toward the chassis frame on their hubs to the amount of half the extra width of the tires used over the 4 inches. This enables the center line of each front tire to be on the same vertical line as the vertical line lying between the twin tires of each corresponding back wheel, without any of the six interchanging flanges or the six tires being set farther away from the chassis frame.

It is to be especially noted that by using this invention the weight of each wheel is carried very close up to the chassis frame, see Figs. 1, 4, 5, 8, thereby saving axle strain, besides having many other advantages not obtainable in existing wheels. When single tires only are used on both the back and front wheels of a chassis, the center line of the tire and the center line of the interchanging flange Z may be the same, as shown at Z, see Fig. 11, and if required, the outer circumference part may be manufactured in the form of a suitable clamping circumference device to enable the special type of tire requiring to be attached to the chassis to be securely fitted, but when a clamping circumference device is used, it must have a suitable interchanging reversible flange or inner circumference to enable the tire and circumference part to be interchanged and reversed over the central boss part, see Fig. 11.

When this invention is used, four different types or widths of tires may be used at the same time and interchanged daily, weekly, or monthly, with each other on the same chassis, or from one chassis to another, until run to destruction, enabling uniform wear and a better mileage to be obtained on all types or dimensions of tires, and it is only necessary to carry or keep in stock say one spare outer circumference part with tire attached, to enable same to be easily interchanged quickly over a standardized boss central part, without the center line of the spare tire when attached, or the center line of the interchanging flange of the outer circumference part being set farther away from the chassis frame, see Figs. 1, 4, 5 and 8.

One outer interchangeable circumference part may form a single wheel, and two outer interchangeable circumference parts (when one is inverted) form a twin wheel when suitably fitted over the standardized boss center part, see Figs. 1, 4, 5 and 8. Different types and dimensions of interchangeable circumference parts may be fitted over the same standardized boss center part, and if wanted they may be pierced with holes to give a light appearance to the wheel, and an outer circumference part with tire attached may be used on either the front or back axle and always have the attachment flange fitted close up to the chassis frame.

In building the standardized boss central parts for single and twin tires, I may manufacture same in all required shapes and dimensions and of suitable materials, provided the standardized outer circumference parts are capable of being easily and quickly interchanged and reversed over the standardized boss central parts, and provided each standardized boss central part is capable of being fitted very close up to the chassis frame when required, regardless of the type or dimensions of the hubs, hub shells and drums used on the chassis. The standardized boss central part constructed to take single tires may also be used to take twin tires, see Figs. 1 and 4, and I may use an additional metal plate or stamping $3^A$, $3^B$, $3^C$, at the back face of the standardized boss central part to strengthen same or armor plate the keyed wood distance pieces at the wheel's center if required, see Figs. 1, 4, 5, and 8.

When twin tires are used, see Figs. 4 and 8, suitable distance pieces of metal or wood may be securely fitted between the twin interchanging attachment flanges, and be detachable with the interchangeable circumference parts, and these distance pieces may take the form of suitable attachment bolts $9^B$, $9^C$, $9^D$, $9^E$, $9^F$, see Fig. 4 and Fig. 8. Although I prefer using wood at the wheel's center, metal distance pieces may, if wanted, be used, but the wood is easily renewed and can be turned out to give a snug and adjustable fitment between the hub and the standardized boss central part, and then be armor plated, see the hub fitment in Figs. 5 and 8.

By using this invention, the inside tire of a twin wheel, regardless of its type, is easily removed or interchanged on any chassis by removing nuts, distance pieces, and flanges, all of which may be locked in position in any well-known manner, and solid rubber band tires may be easily interchanged and reversed with each other anywhere by unskilled labor, enabling a better average mileage to be obtained with each solid rubber band tire, and the nuisance of a commercial chassis being held up for days, weeks or months because it requires a new rubber band tire to be attached, as often occurs at the present time, is overcome, because the solid rubber band tire manufacturer can stock the cheap standardized outer circumference parts and fit the rubber band tires over them at the factory or depot where there is a hydraulic press, and then despatch the tire wanted fitted in position over the inexpensive interchangeable circumference part direct to the chassis user, who can in a few minutes interchange the new tire and circumference part with an old one which may be then returned to the rubber manufacturer for the refitment of a new band tire.

I preferably standardize the various parts of the wheel in suitable dimensions and shapes to interchange all the existing types and dimensions of tires and tire retaining rims on the market over the standardized boss central part.

Figures 9, 10:
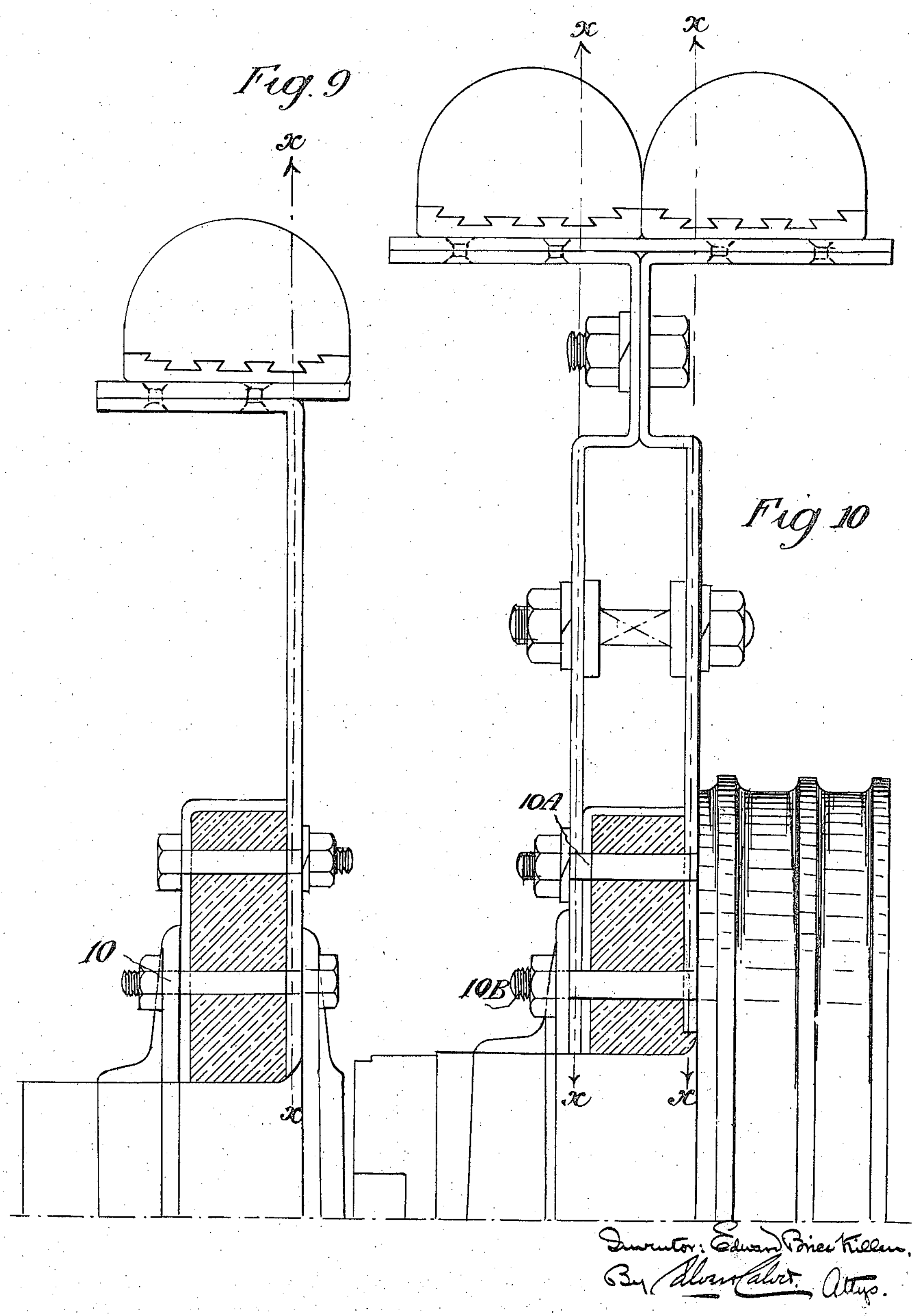
Fig. 9 is a sectional elevation of a single detachable disk wheel manufactured in one principal part and constructed interchangeable and reversible at the hub on the vertical line X.
Fig. 10 is a sectional elevation of a twin detachable disk wheel, each disk wheel being manufactured in one principal part and constructed interchangeable and reversible at the hub on the vertical line X.
Figure 11:
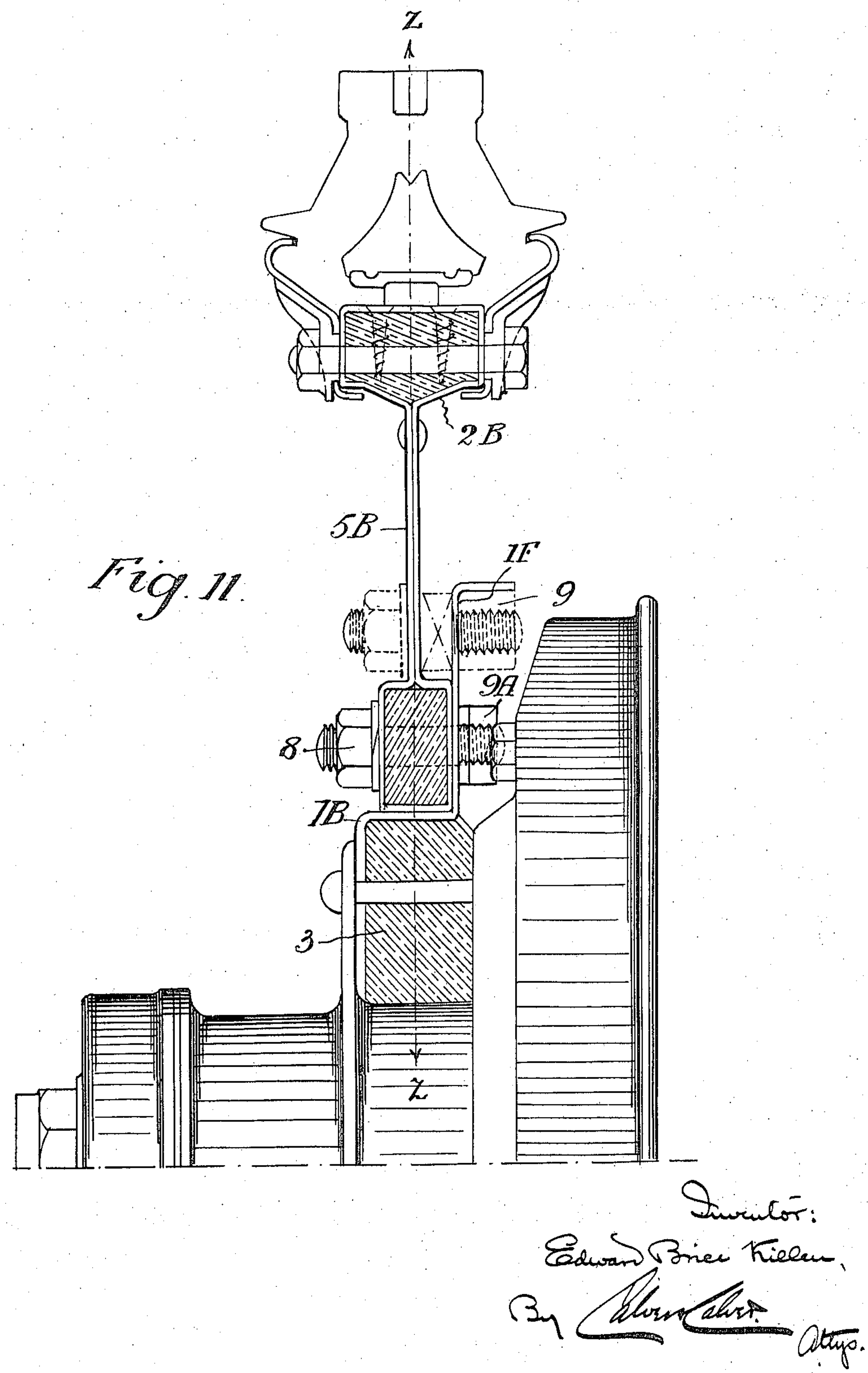
Fig. 11 is another modified form of a disk wheel manufactured in two principal parts, mounted upon its hub and with its outer interchangeable and reversible circumference part and tire rigidly attached to its central boss part, the center line Z of tire, and the center line of the reversing flange being the same.

Although I prefer using wheels having two important parts, namely, an outer interchangeable circumference part, and the standardized boss central part, see Figs. 1, 2, 3, 4, 5, 6, 7, 8 and 11, I may under certain conditions construct the wheel in one instead of in two important parts, see Figs. 9 and 10, and make said wheels with tires attached capable of being interchanged and reversed on the vertical reversing center line of flange X on any chassis to which they are attached, but said wheels are detachable at the hub by means of the hub bolts 10, $10^A$, $10^B$, and cannot be interchanged from one chassis to another on account of the many varying diameters and types of hubs on the market, unless a substitute for my center boss part in the form of a universal distance piece is provided and securely attached to the many existing types and dimensions of hubs on the market thereby forming a universal fitment over which the wheel with tire attached may be interchanged, but the center line of the tire or the weight of the wheel cannot be arranged to be as close up to the chassis frame as when using the wheel with my boss central part, as previously described, see Figs. 5 and 8 showing the position of the vertical lines X, enabling either single or twin wheels when required to be fitted very close up to the chassis frame as compared with Figs. 9 and 10.

In constructing my wheels, I may use standard stampings manufactured from steel plates of suitable gage or thickness according to the type of work for which the wheels are wanted, and these wheels when properly built have great strength for their weight, see Figs. 1 to 11.

From the foregoing it will be understood that my improved wheel comprises an annular vertical or radial web which extends at a right angle to the hub of the wheel and which is preferably stamped from rather heavy sheet steel or other suitable sheet metal; said web, in its preferred form, consisting of two parts detachably secured together, the outer part comprising a vertical or radial attachment flange, as 5, Figs. 1, 2 and 4, and a right angular lateral flange on which the tire is mounted. The inner part of the said web has an outer offset, as $1^D$, Fig. 1, affording a lateral shoulder supporting the flange 5, said flange being removably secured to said inner part of the said web; and said inner part has at its inner portion a second offset portion 1, $1^A$, $1^B$, $1^C$, which, in connection with a side plate, $3^A$, $3^B$, $3^C$, affords a housing for an annular wooden filling piece 3 which will stiffen the inner part of said web which is connected with the hub of the wheel. The lateral flange which supports the tire of the wheel is formed entirely at one side of what may be termed the vertical flange 5 of the outer part of the wheel web, and as the said flange 5 fits against a corresponding outer vertical part of the inner portion of the web said outer part of the web, carrying the tire, and which is readily removable from the inner part of the web, said outer part of said web may be reversed, so that the tire may be located nearer to or farther from the chassis of the vehicle.

The construction referred to is therefore not only well adapted for convenient use in a single tire wheel, as shown in Figs. 1, 2, 5 and 6, but is also adapated for use in a double tire wheel, as shown in Figs. 4 and 8 and in which the vertical flanges 5 or $5^A$ are braced and held separated by distance pieces preferably in the form of flanged bolts $9^B$, $9^C$, $9^E$, the inner part of the web being also braced and held separated in the construction shown in Fig. 4 by flanged bolts $9^D$ In the simplest form of the invention, as shown in Fig. 9, the annular sheet metal web consists of a single piece of metal having a lateral flange which supports the tire, and by modifying this simplest form of the invention slightly, as shown in Fig. 10, the invention is adapted for use in a double tire wheel, the outer parts of the double web being bolted together and the inner parts being spaced and braced by distance pieces consisting preferably of flanged bolts.

Having thus described my invention I claim and desire to secure by Letters Patent:

1. A vehicle wheel comprising a radial annular web extending at a right angle to the hub of the wheel, and consisting of two sheet-metal parts removably attached together, the outer part of said web having a laterally-extending tire-supporting flange projecting entirely at one side of its radial portion, and the inner part of said web having an offset, affording a lateral shoulder, and a radial flange beyond said shoulder and to which flange the radial portion of said outer part is removably secured; whereby the tire-supporting part of said sheet metal web is adapted to be reversed to locate the tire at different distances from the chassis of the vehicle.

2. A vehicle wheel comprising a radial annular web adapted to be secured to the wheel hub and extending at a right angle to said hub, said web having at its periphery a laterally extending tire-supporting flange, said web being formed in two detachable parts the outer one of which carries said laterally extending tire-supporting flange, and the inner one of which has outer and inner offsets, said outer offset affording a shoulder radially supporting said outer part, and the inner offset part, in connection with a side plate, providing a housing, combined with said side plate and an annular wooden filling piece, and suitable bolts passing through the inner part of said metal web and said filling piece to attach the said web to the wheel hub.

3. A vehicle wheel comprising two annular webs each consisting of two parts detachably secured together, the inner parts of said annular webs having outer offset portions, affording shoulders, and the outer parts of said annular webs each having a radial part and a lateral part extending entirely to one side of said radial part, combined with distance pieces for spacing the said radial portions of said webs from each other, and means for securing the spaced outer web portions to the said inner web portions, thereby affording a suitable mounting for a double tire.

4. A vehicle wheel comprising two annular webs each consisting of two parts detachably secured together, the inner parts of said annular webs having outer offset portions, affording shoulders, and the outer parts of said annular webs each having a radial part and a lateral part extending entirely to one side of said radial part, combined with distance pieces for spacing the said radial portions of said webs from each other, and means for securing the spaced outer web portions to the said inner web portions, thereby affording a suitable mounting for a double tire, said distance pieces consisting of flanged bolts provided with suitable nuts.

In testimony whereof I affix my signature in presence of two witnesses.

EDWARD BRICE KILLEN.

Witnesses:

JOHN LIDDLE,

JOHN TRAIN LIDDLE.